B. M. W. HANSON.
METAL WORKING MACHINE.
APPLICATION FILED JUNE 7, 1920.

1,412,864.

Patented Apr. 18, 1922.
5 SHEETS—SHEET 1.

Fig. 1

Inventor
Bengt M. W. Hanson.
By
His Attorney

B. M. W. HANSON.
METAL WORKING MACHINE.
APPLICATION FILED JUNE 7, 1920.

1,412,864.

Patented Apr. 18, 1922.
5 SHEETS—SHEET 4.

Inventor
Bengt M. W. Hanson
Hasbart
His Attorney.

UNITED STATES PATENT OFFICE.

BENGT M. W. HANSON, OF HARTFORD, CONNECTICUT.

METAL-WORKING MACHINE.

1,412,864. Specification of Letters Patent. Patented Apr. 18, 1922.

Application filed June 7, 1920. Serial No. 387,256.

*To all whom it may concern:*

Be it known that I, BENGT M. W. HANSON, a citizen of the United States, and a resident of Hartford, county of Hartford, State of Connecticut, have invented certain new and useful Improvements in Metal-Working Machines, of which the following is a specification.

This invention relates generally to metal working machines of the sort having a reciprocal support or table.

In the machine herein selected for illustrating the present invention, a reciprocal work support, during its operative or working stroke, is moved at a fast rate of speed while the work is being brought up to the tool and at a slow rate of speed while the tool is operating upon the work, and during its inoperative stroke the work table is returned at a relatively fast rate of speed; also it is preferable to recede the work table from its working level on its return or inoperative stroke so that the tool will not injure the work on the return stroke thereof.

The present invention has more to do with the means for effecting movement of the reciprocable member, for instance a work table, the aim of the invention being to provide means of this sort having features of novelty and advantage.

The various features of the invention will be described with reference to their use in the particular machine herein selected for the purpose of illustration, which is the milling machine, but I desire it to be understood that the features of novelty are susceptible of other embodiments. In describing the embodiment of the invention herein illustrated, conventional terms will be used but it is to be understood that they are used solely for the purpose of description, and are not to be taken as having a limiting effect.

Referring to the drawings, $a$ is the bed of the machine on which is a pair of adjustable columns $b$ carrying vertically adjustable bearings $c$ in which are mounted a head stock spindle $d$ and a tail stock center $e$. The operating tool, for instance a milling cutter, (not shown) is supported between the spindle $d$ and the center $e$. The spindle $d$ may be driven in any suitable manner.

Figures 3, 9, 10, 11:
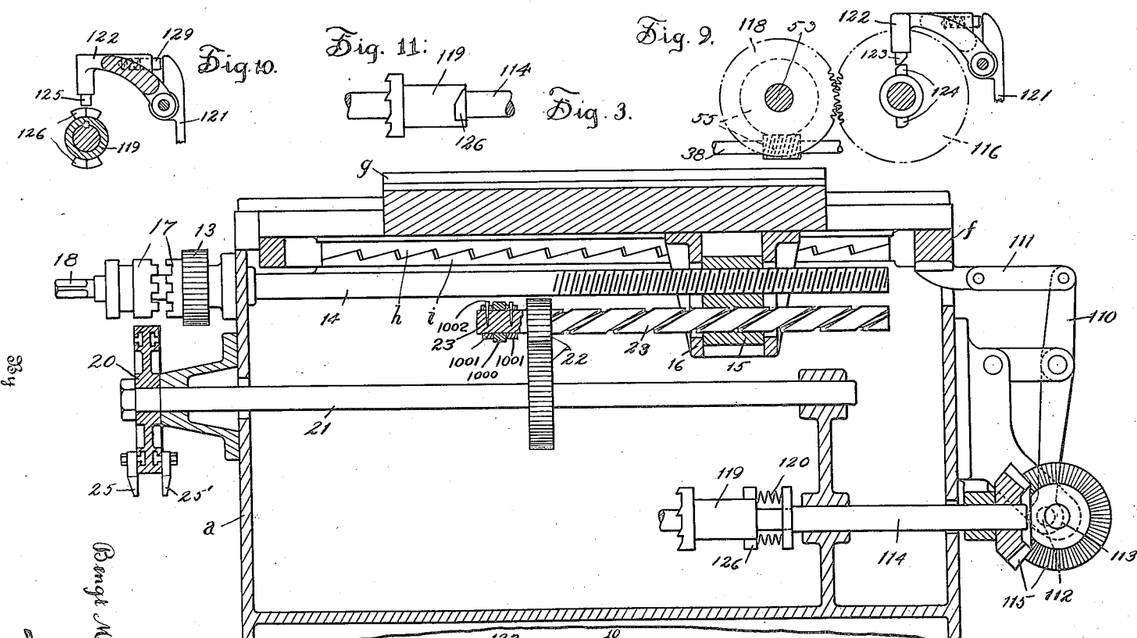
Fig. 3 is a side view showing the work table in longitudinal section and the connection between the work table and the tappet wheel, which tappet wheel primarily controls the power operated mechanism for moving the work table.
Fig. 9 is a left end view thereof, referring to Fig. 8.
Fig. 10 is a sectional view therethrough taken substantially on line 10—10 of Fig. 8.
Fig. 11 is a detail view of one of the clutch members of the mechanism illustrated in Fig. 8.

Supported on the top of the bed $a$ and having one end positioned between the columns $b$, is a saddle $f$ on which the work support or table $g$ is adapted to be reciprocated. In the drawings, I have shown an arrangement such as is disclosed in my Patent No. 1,295,157, dated September 25th, 1912, for receding the table below its working level during its return stroke. This arrangement (see Fig. 3) comprises briefly saw-teeth members $h$ secured to or integral with the work table saddle $f$ and riding upon oppositely arranged saw-teeth member $i$ fixed to the bed, so that upon a slight longitudinal movement of the saddle $f$, a vertical displacement thereof may be effected. The construction so far described is old and well known and, therefore, is but briefly referred to.

Figure 1:
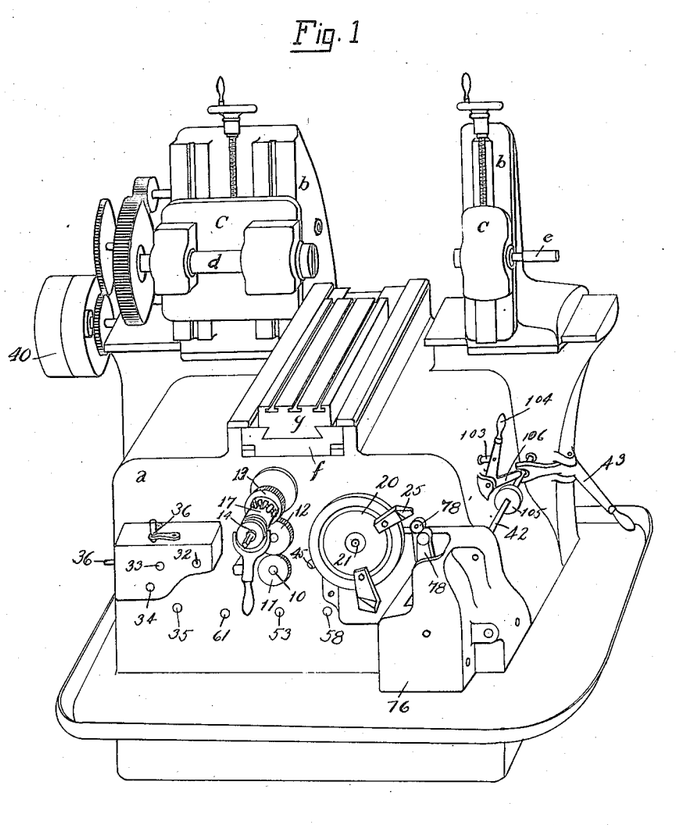
Fig. 1 is a perspective view of a milling machine to which the features of novelty of the present invention are applied.
Figure 2:
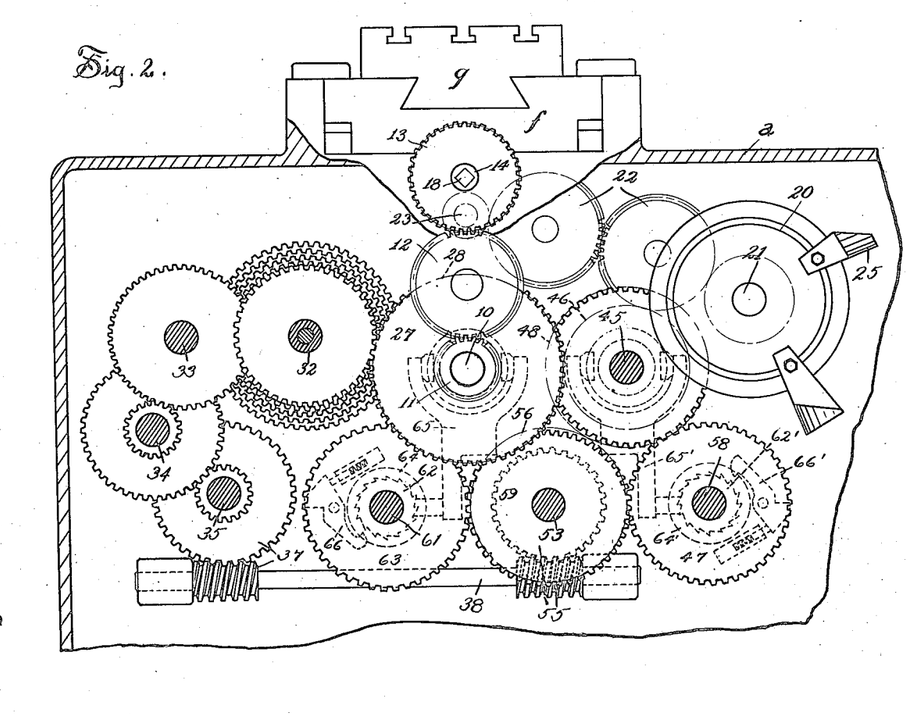
Fig. 2 is a front view of the mechanism for effecting movement of the work table, the work table and the saddle therefor being in end elevation.

Reference may now be had to the mechanism for moving the work table and wherein the present invention resides. Within the bed $a$ are a plurality of shafts, the relative positions of which may be readily determined from Figs. 1 and 2. The manner in which these shafts are connected together may be most easily seen from Figs. 2 and 12. The number 10 designates a shaft, herein referred to for convenience as the main shaft, carrying on its forward end a gear 11, driving through an intermediate gear 12, a gear 13 on a feed screw 14 having threaded engagement with a nut 15, carried by a bracket 16 fixed to the under side of the work table. The nut 15 and the bracket 16 are vertically movable relative to one another to allow for vertical displacement of the work table to and from its working level. The gear 13 is adapted to be engaged with and disengaged from the feed screw by means of a manually operated clutch 17. This clutch is thrown out to disengage the feed screw from the power operated mechanism when it is desired to traverse the work table manually as by means of a crank (not shown) positioned on the outer squared end 18 of the feed screw.

The power operated mechanism for driving the work table is primarily controlled by means of a rotatable tappet wheel 20 which positively derives its motion from the lineal movement of the work table. In the present instance, the tappet wheel is fixed on the forward end of a shaft 21 driven through a train of gears 22 from a shaft 23 provided with a helical thread engaging a corresponding thread in the feed screw nut 15. The shaft 23 is held against longitudinal movement in the following manner. One end of the shaft is rotatably mounted in a bushing or boss 1000 which is formed integral with or otherwise attached to the base of the machine. Secured to the shaft 23 by means of pins 1002 are thrust washers 1001. These thrust washers engage against the bushing 1000 and thus hold the shaft against longitudinal movement. The arrangement is such that the tappet wheel will be rotated slightly less than one complete revolution when the work table is moved, in either direction, through its maximum stroke. The shaft 23 is, of course, supported against longitudinal movement. It will be seen that as the tappet wheel is positively connected to the work table, the wheel and table always bear a predetermined relation to each other whether the table is moved by power or manually. The tappet wheel is equipped with two sets of adjustable tappets, one set of tappets 25 being effective to control the speed of the work table, and the other set 25' being effective to control the direction of traverse of the work table, all of which will be described hereinafter more in detail.

Loose upon the main shaft 10 is a pair of like gears 27, 28 respectively provided with clutches 29, 30 operable through the sleeve 31 slidably mounted on the main shaft 10. In the present instance the clutches 29, 30 are shown diagrammatically as the particular construction thereof is immaterial. By preference they are the frictional type. It will be understood that when the sleeve 31 is moved in one direction the clutch 29 will engage the gear 27 with the shaft 10 and the gear 28 will run loose, and when the sleeve 30 is moved in the opposite direction the gear 27 will run loose and the gear 28 will be fast on the shaft. Movement of the sleeve 31 is controlled by an escapement ratchet clutch mechanism $p$ which in turn is controlled by the set of tappets 25 on the tappet wheel 20, as will be hereinafter described.

Figure 12:
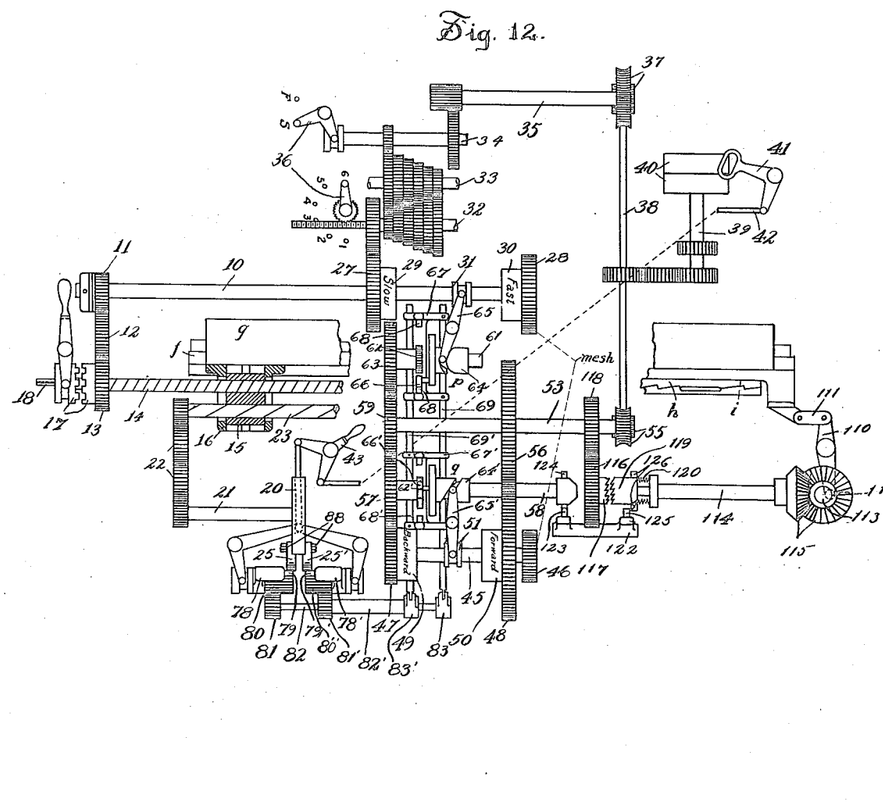
Fig. 12 is a diagrammatic layout showing the entire mechanism for moving the work table, all of the shafts being shown in a single horizontal place and all of the gears being in proper intermeshing relation with the exception of gears 28 and 46 which, as indicated, do intermesh.

The gear 27 is constantly driven in a single direction within a relatively low range of selective speeds through the train of gearing mounted upon the shafts 32 to 35 inclusive. This train of gearing includes means, having controlling handles 36, for engaging any single speed in the range of selection, this means being shown conventionally in the drawings as it may be of any suitable type. The shaft 35 is driven through worm gearing 37 by a countershaft 38 extending transversely at the rear of the machine. The shaft 38 is driven, as shown in Fig. 12, from the shaft 39 carrying loose and fixed pulleys 40 about which passes the drive belt, (not shown). 41 denotes a belt shifter connected by a longitudinally slidable rod 42 to a handle 43.

Parallel to the main shaft 10 is a shaft 45 to which is fixed a gear 46 constantly meshing with the "fast" gear 28. Upon the shaft 45 are a pair of loose gears 47, 48 respectively provided with clutches 49, 50. These clutches may be similar to the clutches 29, 30 and are similarly operated by shifting the sleeve 51. Movement of this sleeve is controlled by an escapement ratchet clutch mechanism $q$ which in turn is controlled by the set of tappets 25' on the tappet wheel.

The gears 47, 48 are constantly driven in opposite directions from an intermediate shaft 53 connected by worm gearing 55 to the countershaft 38. In the present instance, the gear 48 meshes with the gear 56 fixed to the shaft 53, and the gear 47 meshes with an intermediate gear 57 loose on shaft 58 and meshing with a gear 59 on the shaft 53. The arrangement is such that the power operated clutch 29, when thrown in, results in a slow rate of travel of the work table forwardly, that is on its operative stroke; when the clutches 30 and 50 are both thrown in the work table will move forwardly at a fast rate of speed; and when the clutches 30 and 49 are thrown in the work table will move at a fast rate of speed backwardly, that is on its return stroke. For clearness, in Fig. 12, I have indicated clutch 29 as "slow;" clutch 30 as "fast;" clutch 49 as "backward" and clutch 50 as "forward."

The escapement ratchet clutch mechanisms $p$, $q$ which control the two pairs of power operated clutches 29, 30 and 49, 50 are similar in construction and therefore but one need be described in detail. Similar parts of these two mechanisms are designated by like numerals but the numerals of mechanism $q$ are primed.

On the shaft 61 is a freely rotatable unit including a ratchet wheel 62 and a gear 63 which gear meshes with the gear 59 on the shaft 53. As the shaft 53 is constantly driven, the gear 63 together with the ratchet wheel 62 is constantly rotated. Also mounted upon the shaft 61 is a cam 64 which upon rotation shifts a shipper lever 65 to move the sleeve 31 back and forth on the shaft 10 and thereby engage and disengage the clutches 29, 30. Carried by the cam 64 is a spring pressed pawl 66, periodic engagement of which with the constantly rotating ratchet wheel 62 is controlled by an escapement yoke 67 having diametrically opposite stops 68 adapted to be alternately brought into the path of travel of the pawl 66 so that the cam 64 is intermittently rotated through an angle of 180°. The escapement yoke 67 is fixed to, so as to move with, a longitudinally movable rod 69 slidably supported in fixed parts 70 of the bed $a$. The yoke 67 is slidable on the rod 69' similar to the rod 69. The yoke 67' is fixed to the rod 69' and slides on the rod 69.

Movements of the escapement yokes 67, 67' are controlled through similar connections by the two sets of tappets 25, 25' respectively. Fulcrumed upon a rod 75 positioned within an extension 76 of the bed $a$ is a pair of swinging levers 78, 78' having at their upper ends pins 79, 79' which respectively cooperate with the two sets of tappets 25, 25'. The pin 79 is normally urged outwardly of the lever 78 by means of a spring, as shown. Extending laterally from the hub of lever 78 is a segmental rack 80 meshing with a rack 81 fixed to a rocking shaft 82 carrying a fixed arm 83 which is connected by means of a link 84 to an arm 85 fixed to one end of the rod 69. Similarly, extending laterally from the hub of lever 78' is a segmental rack 80' meshing with a segmental rack 81' fixed to a sleeve 82' journalled on the shaft 82. The sleeve 82' carries a fixed arm 83' connected by means of a link 84' to an arm 85' fixed to rod 69'.

Figure 7:
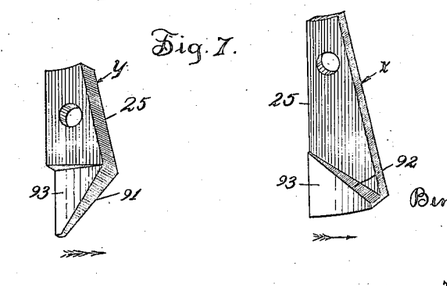
Fig. 7 is perspective view of a pair of tappets.

The two sets of tappets 25, 25' are adjustably carried on opposite sides of the tappet wheel 20 but extend beyond the periphery thereof. To permit of ready adjustment of the tappets, they the secured to the wheel by means of bolts 88, the heads of which work in annular grooves 89 in the side faces of the tappet wheel 20. The tappets 25 are arranged in pairs, the construction of each pair being such that one tappet will throw the swinging lever 78 in one direction and the next tappet will throw the lever in the opposite direction. From Fig. 7 the construction of a pair of tappets 25 may be clearly understood. The tappet $y$ is adapted to throw the swinging lever outwardly, that is to say, away from the tappet wheel, and the tappet $x$ to throw the swinging lever inwardly. The tappets are effective when moved in the direction of the arrows. The forward edge of the tappet $y$ is bevelled at its outer end to provide an outwardly facing cam surface 91 which when brought into engagement with the pin 79 causes the lever 78 to swing outwardly. The tappet $x$ has an inwardly facing cam surface 92 which when brought into engagement with the pin 79 causes the lever 78 to swing inwardly. Since the tappet wheel rotates in one direction when the work table is moved on its operative stroke and is rotated in the opposite direction on the return stroke of the work table, the arrangement must be such that each tappet 25, when moved in one direction only, will trip the swinging lever 78. To this end, each of the tappets 25 is provided with a bevel face 93 inclined from the rear edge of the tappet to the active cam surface thereof and adapted to wipe against the outer end of the pin 79 and force it back into the swinging lever 78 without tripping the latter. The tappets 25' which control the ratchet clutch $p$ are but two in number as during a complete cycle of the work table only two changes in the direction of movement thereof takes place; and these tappets may be similar in construction to tappets 25 but it is not necessary that they be provided with the bevel faces 93.

In order to automatically stop movement of the work table when it reaches the end of its operative stroke and without throwing off the power, the ratchet clutch mechanism $q$ for the clutches 49, 50 is provided with a third stop 101 positioned midway between the stops 68' on the yoke 67' and normally maintained in the path of the pawl 66' by a spring 107. When the pawl 66' is tripped by stop 101, the cam 64' will be stopped in a neutral position where both of the clutches 49, 50 are disengaged from the shaft 58. At this time, the "fast" gear 28 is fixed to the main shaft 10 by the clutch 30 as will be described in the brief statement of the operation. The stop 101 is carried by a lever 102 connected by a link 103 to a hand operated lever 104. To prevent the operator from manually operating the lever 104 and thereby releasing the pawl 66' from the stop 101 when the power is off, the rod 42 is provided with an abutment or disk 105 which is brought under a laterally extending arm 106 on the lever 104 when the rod 42 is shifted into position to throw the drive belt onto the loose pulley 40. It will thus be seen that when the power is thrown off, actuation of the lever 104 which would result in a disturbance of the sequence of movement of the parts is prevented and actuation of this lever cannot be had until the power is again thrown on.

The operation of the construction so far described is briefly as follows.

It is of course obvious, that the present statement as to the operation is by way of example only. Any number of pieces of work within the capacity of the machine may be positioned on the work table and the proper number of tappets adjusted on the tappet wheel.

To set up the machine, the desired number of pieces of work are secured on the work table in properly spaced relation. Preferably, the pieces of work are removably carried by the usual fixtures adjustably mounted on the work table so that after one set of pieces of work is milled, another set may be substituted therefor in the fixtures without requiring further adjustment of the tappets. By way of example, suppose three pieces of work are so positioned on the table that the table need be moved but three-quarters of its extreme travel to successively bring the pieces of work into engagement with the milling cutter. The tappets 25' which control the direction of movement of the table are two in number and are positioned on the tappet wheel 20 at an angle of about 270° apart, the angular distance between these two tappets corresponding of course, approximately to the extent of travel of the work table on either of its strokes. On the other side of the tappet wheel are properly positioned tappets 25 corresponding in number (6) with the number of changes in speed of the work table during a complete cycle. The tappets 25 are disposed within the angle of 270° covered by the tappets 25'. When adjusting the tappets, the power is on, the levers 78, 78' are in operative position relative to the tappets, and the gear 13 is disengaged from the feed screw 14 by clutch 17. The work table is manually traversed and when a piece of work is about to be engaged by the tool, a tappet 25$^x$ is adjusted on the tappet wheel to engage the lever 78. As the work leaves the tool, a tappet 25$^y$ is positioned to engage the lever 78 and at the end of the operative stroke at which time the last piece of work has just cleared the tool, a tappet 25'$^y$ is positioned to swing the lever 78' outwardly and at the end of the inoperative stroke of the work table, the tappet 25'$^x$ is positioned to throw the lever 78' inwardly.

Figure 4:
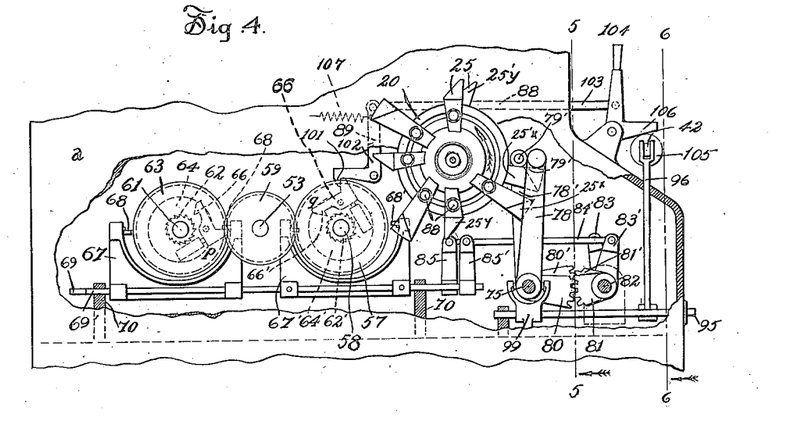
Fig. 4 is a fragmentary view showing a pair of escapement ratchet clutch mechanisms and the connections through which they are controlled by the tappet wheel.
Figures 5, 6:
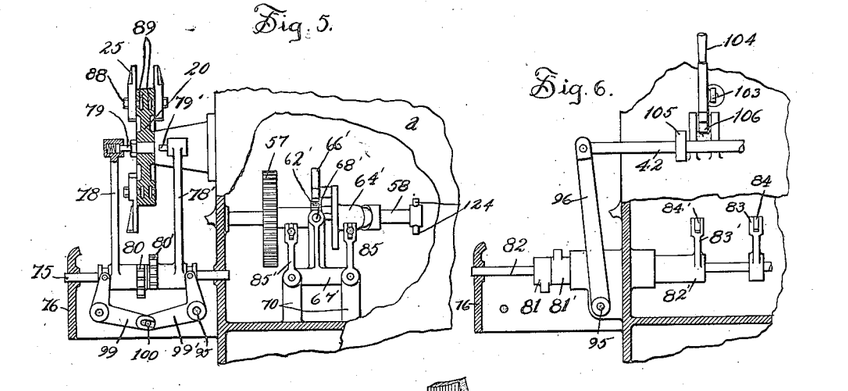
Fig. 5 is a view taken substantially on line 5—5 of Fig. 4 looking in direction of the arrow, and the tappet wheel being in section.
Fig. 6 is a sectional view taken substantially on line 6—6 of Fig. 4 and looking in the direction of the arrow.

In Figs. 4 and 12, the parts are shown in the position which they assume when the work table is automatically stopped at the end of its inoperative stroke. In this position, the work table is at its working level; the cam 64', due to the tripping of the pawl 66' by the stop 101, is in such position that the sleeve 51 is in neutral position and the gears 47, 48 are running free; the "fast" gear 28 is clutched to the main shaft 10 and the "slow" gear 29 is free. To start the work table, the handle 104 is operated to withdraw the stop 101 from the pawl 66' whereupon this pawl engages the ratchet wheel 62' so that the cam 64' is rotated until the pawl 66' is tripped by the left hand escapement stop 68' referring to Figs. 4 and 12 and in this position of the cam 64' the "forward" clutch 50 is thrown in to fix the gear 48 to the shaft 45 and thus through the intermeshing gears 46, 28, the feed screw 14 will be rotated, it being understood that the manually operated clutch 17 has been thrown in; the complete drive now being from the source of power through the shaft 38; intermeshing gears 55, 55; shaft 53; intermeshing gears 56, 48; shaft 45; intermeshing gears 46, 28; main shaft 10, and gears 11, 12 and 13.

The work table will now start on its operative stroke and through the connections described, the tappet wheel is positively driven by the work table in the direction of the arrow, Fig. 4. The work table will move at a fast rate of speed until the first piece of work is about to engage the milling cutter, at which time the first tappet 25$^x$ engages the lever 78 swinging the same inwardly, thereby shifting the escapement yoke 67 to the right whereupon the cam 64 will make a half turn resulting in engagement of the "slow" clutch 29 and a slow travel of the work table while the tool is operating on the first piece of work. As the first piece of work leaves the tool, the second tappet 25$^y$ will swing the lever 78 outwardly, thereby shifting the escapement yoke 67 to the right to trip the pawl in the position shown in Fig. 4, thus stopping the cam 64 in such position that the "fast" gear 28 is clutched to the main shaft 10 whereupon the work table will move quickly forward until the second piece of work is about to engage the tool, at which time the third tappet 25$^x$ will become effective to throw in the slow speed. Similarly, the fourth tappet 25$^y$ and the fifth tappet 25$^x$ will result in a fast and slow movement, respectively, of the work table. At the end of the operative stroke of the work table and at which time the last piece of work is just leaving the tool, the last tappet 25$^y$ engages lever 78 and the tappet 25′ʸ engages the lever 78′ so as to throw in the "fast" clutch 30 and the "backward" clutch 49, and result in moving the work table on its return stroke at a fast rate of speed; the drive now being from the source of power through the shaft 38; intermeshing gears 55, 55; shaft 53; intermeshing gears 59, 57, 47; shaft 45; intermeshing gears 46, 28; main shaft 10, and intermeshing gears 11, 12 and 13. At about the same time that the clutches are thrown in to return the work table, the work table is receded to a plane below its working level as hereinafter described. On the return stroke of the work table, the tappet wheel is rotated in a clockwise direction and the bevel faces 93 of the tappets 25 will wipe against the spring pressed pin 79 without throwing the lever 78. When the work table has reached the end of its inoperative stroke, the tappet 25′ˣ engages the lever 78′ thereby moving the yoke 67′ to the right to withdraw the right hand escapement stop 68′ from the pawl 66′ whereupon the cam 64′ will rotate until the pawl 66′ engages the stop 101 and the result is the work table is automatically stopped at the end of its operative stroke. Just previous to the engagement of the pawl 66′ with the stop 101 the tripping device controlling the table receding mechanism hereinafter described is actuated so that the table is raised to its working level and is in that position while the machine is idle. The milled pieces of work are now replaced with the new pieces; the handle 104 is manually operated, and the cycle repeated.

It will be seen that the work table feed screw 14 may be entirely disengaged (by clutch 17) from the power operated driving mechanism and rotated by hand to traverse the work table without throwing the power off of the mechanism, in which case the tappets on the tappet wheel will normally operate the ratchet clutch mechanism $p$, $q$, and their associated friction clutches, and the screw may be reengaged with the power at any point without disturbing the predetermined sequence of movements.

When the power is thrown off of the machine, that is, when the drive belt is shifted to that pulley 40 which is loose on the shaft 39, the ratchet clutch mechanisms $p$, $q$, are no longer effective since the ratchet wheels thereof are not being driven. Under this condition of no power, it is essential when the work table is traversed manually, to prevent actuation of the escapement yokes 67, 67′, and the resultant release of the ratchet pawls 66, 66′, in order to prevent an incorrect sequence of the various automatic movements of the cycle when the power is again thrown on, that the ends of the swinging levers 78, 78′ are moved out of cooperative relation with the tappets simultaneously with the throwing off of the power. In the extension 76 of the bed $a$ is journalled a rock shaft 95 connected by means of a lever 96 to one end of the rod 42 of the belt shifting device 41. Fixed to the rock shaft 95 is a bell crank 99′ having a forked end engaging in a groove in the hub of the swinging lever 78′. A similar bell crank 99 engages the hub of the swinging lever 78. These two bell cranks are connected together by a pin and slot connection 100 so as to open simultaneously. It will readily be seen that when the handle 43 is moved in a direction to throw off the power, the swinging levers 78, 78′, will be moved axially of the rod 75 away from each other and out of control of the tappets, and when the handle 43 is moved in the other direction, the swinging levers 78, 78′ will be brought back into cooperative position relative to the tappets.

If the work table is moved by hand while the power is off, that is while the drive belt is on the loose pulley 40, the table should be returned to the starting position before the power is again thrown on, for otherwise the various movements of the cycle will not occur in proper sequence. The same result may be accomplished by leaving the work table in the position reached by hand operation and with the feed screw 14 still disengaged from the power, throw the power on, operate handle 104 to release the pawl 66′, and shift each lever 78, 78′ by hand, once for each tappet which has passed the respective levers during manual traverse of the table. The feed screw may then be reengaged with the power and the cycle completed automatically.

Figure 8:
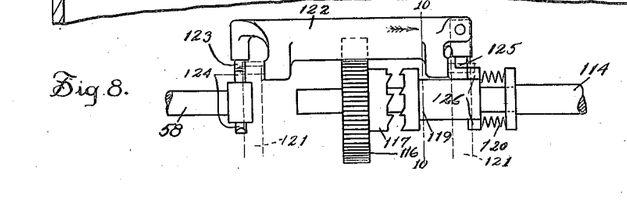
Fig. 8 is a detail view, in side elevation, of the tripping device which automatically engages the table receding mechanism.

As heretofore stated during the return or inoperative stroke of the work table, the table, due to the cooperating saw-teeth members $h$, $i$, is receded to a plane below its working level when the saddle $f$ is moved longitudinally to a slight extent. The mechanism for so moving the saddle may be varied but by way of illustration a preferred embodiment is herein disclosed. On the rear end of the machine is pivoted a lever 110 connected at one end by means of a link 111 to the saddle $f$, and at its lower end to an eccentric 112 on a suitably supported shaft 113. Journalled in suitable bearings in the bed $a$ and in axial alinement with shaft 58 is a shaft 114 connected to the shaft 113 by miter gears 115. Upon the shaft 114 is a loose gear 116 having an integral clutch member 117 meshing with, so as to be constantly rotated by the gear 118 fixed on the shaft 53. Gear 116 is intermittently engaged with the shaft 114 by means of a clutch member 119 which is automatically controlled by the ratchet clutch mechanism $q$ acting through the tripping device shown most clearly in Figs. 8 to 10 inclusive.

The clutch member 119 has axial movement on the shaft 114 but is keyed to rotate therewith. It is normally urged into engagement with the clutch teeth 117 on the gear 116 by springs 120. Suitably pivoted on the fixed parts 121 of the bed $a$ is a trip lever 122 having at one end a finger 123 cooperating with a pair of diametrically opposite fingers 124 fixed on the rear end of the shaft 58. On the other end of the lever 122 is a finger 125 cooperating with a pair of diametrically opposite lobes 126 on clutch member 119. The trip lever 122 carries a spring pressed plunger 129 acting against the fixed part 121 so that the trip lever is normally urged into operative position.

With this arrangement, upon actuation of the ratchet clutch mechanism $q$, the cam 64' together with the shaft 58 rotates one-half a revolution, and one of the fingers 124 will engage finger 123 of the trip lever swinging the latter up and raising the finger 125 of the trip lever out of engagement with the lobe 126 of the clutch member 119. The clutch member being released will, under the influence of the springs 120, engage the gear 116 to the shaft 114 so that the latter is rotated to drive the shaft 113 resulting, through the eccentric 112 and lever 110, in a slight longitudinal movement of the saddle $f$ and owing to the cooperating saw-teeth $i$ and $h$ the saddle will be displaced vertically. As soon as the finger 124 has passed the finger 123 the trip lever 122 under influence of the spring pressed plunger 129 will swing downwardly so that the finger 125 is in the path of travel of the second lobe 126. Thus when the clutch member 119 together with the shaft 114 has rotated one-half a revolution, the second lobe 126 will wipe against the finger 125 moving the clutch member 119 to the position shown in Fig. 8, so that the shaft 114 is stationary until the ratchet mechanism $q$ is again actuated.

I claim as my invention:

1. In a machine of the character described, a member adapted to be moved in opposite directions at variable speeds, power operated clutch mechanism controlling the direction of movement of said member, power operated clutch mechanism controlling the speed of movement of said member, one of said mechanisms being adapted to drive said member through the other of said mechanisms, an escapement ratchet clutch mechanism controlling each of said power operated clutch mechanisms, and automatically operated means controlling said escapement ratchet clutch mechanisms.

2. In a machine of the character described, a reciprocating member, a pair of power operated clutches controlling the direction of travel of said member, a pair of power operated clutches controlling the speed of travel of said member, one pair of said clutches being adapted to drive said reciprocating member through one of the clutches of the other pair, an escapement ratchet clutch mechanism controlling each pair of clutches, and automatically operated means controlling said escapement ratchet clutch mechanisms.

3. In a machine of the character described, a member to be moved in opposite directions at variable speeds, a main shaft connected to said member, a pair of gears loose on said shaft, a power operated clutch for each of said gears, means for constantly driving one of said gears in a single direction, a second shaft connected to the other of said gears, a pair of gears loose on the second shaft, a power operated clutch for each of said last mentioned gears, means for driving said last mentioned gears in opposite directions, an escapement ratchet clutch mechanism for controlling each pair of gears, and automatically operated means controlling said escapement ratchet clutch mechanisms.

4. In a machine of the character described, a reciprocating member, power operated clutches controlling the direction of travel of said member, power operated clutches controlling the speed of travel of said member, a rotary member, adjustable tappets thereon controlling the first mentioned power operated clutches, and adjustable tappets on said rotary member controlling the second mentioned power operated clutches.

5. In a machine of the character described, a reciprocating member, a pair of power operated clutches, controlling the direction of travel of said member, a pair of power operated clutches controlling the speed of travel of said reciprocating member, one pair of said clutches being effective to drive said reciprocating member through one of the clutches of the other pair, an escapement ratchet clutch mechanism controlling each pair of clutches, a rotary member, and two sets of adjustable tappets thereon, one set for controlling each escapement ratchet clutch mechanism.

6. In a machine of the character described, a reciprocating member, means for moving the same, a member rotatable in opposite directions corresponding to the direction of movement of said reciprocating member, a plurality of adjustable means on said rotary member controlling said moving means, each of said adjustable means being operative when rotated in one direction and inoperative when rotated in the opposite direction.

7. In a machine of the character described, a reciprocating member, means for moving the same including a power operated clutch, a tappet wheel adapted for rotation in opposite directions, tappets adjustably carried by said rotary member, an operative connection between said tappets and clutch, each of said tappets being operative to actuate said connection when rotated in one direction and inoperative when rotated in the opposite direction.

8. In a machine of the character described, a reciprocating member, means for moving the same including mechanism for controlling the speed of movement of said reciprocating member, a tappet wheel rotatable in opposite directions corresponding to the direction of movement of said reciprocating member, and a plurality of tappets on said rotary member for controlling said mechanism, each of said tappets being operative when rotated in one direction and inoperative when rotated in the opposite direction.

9. In a machine of the character described, a reciprocating member, means for moving the same including mechanism controlling the speed of said member and mechanism controlling the direction of movement of said member, a tappet wheel rotatable in opposite directions corresponding to the direction of movement of said reciprocating member, adjustable tappets on said wheel controlling the speed controlling mechanism, and adjustable tappets on said wheel controlling said direction controlling mechanism.

10. In a machine of the character described, a reciprocating member, means for moving the same including mechanism controlling the speed of said reciprocating member and mechanism controlling the direction of movement of said reciprocating member, a tappet wheel rotatable in opposite directions corresponding to the direction of movement of said reciprocating member, adjustable tappets on said wheel controlling said speed controlling mechanism, and adjustable tappets on said wheel controlling the direction controlling mechanism, each of said tappets being operative when rotated in one direction and inoperative when rotated in the opposite direction.

11. In a machine of the character described, a reciprocating member, means for moving the same including a ratchet clutch and an escapement therefor, a tappet wheel adapted for rotation in opposite directions, and tappets adjustably carried thereby and controlling said escapement, each tappet being operative when rotated in one direction and inoperative when rotated in the opposite direction.

12. In a machine of the character described, a reciprocating member, means for moving the same including mechanism provided with an escapement clutch for controlling the direction of movement of the reciprocating member, said moving means also including mechanism provided with an escapement clutch for controlling the speed of movement of said reciprocating member, a member movable in opposite directions corresponding to the direction of movement of said reciprocating member, and means thereon for controlling both of said escapement clutches.

13. In a machine of the character described, a reciprocating member, means for moving the same including mechanism provided with an escapement ratchet clutch for controlling the direction of movement of said reciprocating member, said moving means also including mechanism provided with an escapement ratchet clutch for controlling the speed of movement of said reciprocating member, a tappet wheel rotatable in opposite directions corresponding to the direction of movement of said reciprocating member, a plurality of tappets on said tappet wheel controlling the escapement of said speed controlling mechanism and a plurality of tappets on said rotary member controlling the escapement of said direction controlling mechanism.

14. In a machine of the character described, a member adapted to be moved in opposite directions at variable speeds; means for moving said member including a pair of power operated clutches for controlling the speed of movement of said member, a pair of power operated clutches for controlling the direction of movement of said member, and an escapement ratchet clutch mechanism for controlling each of said pairs of clutches; and a rotatable tappet wheel provided with two sets of adjustable tappets, one set for controlling each of said ratchet clutch mechanisms.

15. In a machine of the character described, a member adapted to be moved in opposite directions at variable speeds, power operated clutch mechanism controlling the direction of travel of said member, power operated clutch mechanism controlling the speed of travel of said member, a rotary member, adjustable tappets thereon controlling the first mentioned power operated clutch mechanism, and adjustable tappets on said rotary member controlling the second mentioned power operated clutch mechanism.

16. In a machine of the character described, an element adapted to be moved in opposite directions at variable speeds, means for moving the same, a member rotatable in opposite directions corresponding to the direction of movement of said element, and a plurality of adjustable means on said rotary member controlling said moving means, each of said adjustable means being operative when rotated in one direction and inoperative when rotated in the opposite direction.

17. In a machine of the character described, a reciprocating member, power operated clutches controlling the direction of movement thereof, power operated clutches controlling the speed of movement thereof, and a rotatable member positively driven by said reciprocating member and controlling said clutches.

18. In a machine of the character described, a reciprocating member, means for moving the same, a rotary tappet wheel controlling said moving means, and a positive connection between said reciprocating member and wheel whereby said wheel is rotated in one direction when the reciprocating member is advanced and in the opposite direction when the reciprocating member is returned.

19. In a machine of the character described, a reciprocating member, means for driving the same, a rotatable tappet wheel provided with a plurality of adjustable tappets controlling said moving means, each of said tappets being operative when rotated in one direction and inoperative when rotated in the opposite direction, and a positive connection between said reciprocating member and wheel whereby the latter is rotated in one direction when the reciprocating member is advanced and in the opposite direction when the reciprocating member is returned.

20. In a machine of the character described, a reciprocating member, means for moving the same, a rotatable wheel provided with adjustable tappets for controlling said moving means, and a positive connection between said wheel and reciprocating member including a nut carried by said member, and a shaft having threaded engagement with said nut.

21. In a machine of the character described, a reciprocating member; means for moving the same including power operated clutches controlling the speed of said member and power operated clutches controlling the direction of movement of said member; a tappet wheel, adjustable tappets on said wheel controlling all of said clutches, and a positive connection between said reciprocating member and wheel whereby the latter is rotated in one direction when the reciprocating member is advanced and in the opposite direction when the reciprocating member is returned.

22. In a machine of the character described, a reciprocating member; means for moving the same including mechanism provided with an escapement ratchet clutch for controlling the direction of movement of said reciprocating member, said moving means also including mechanism provided with an escapement ratchet clutch for controlling the speed of movement of said reciprocating member; a tappet wheel, a plurality of tappets on said wheel controlling the escapement of said speed controlling mechanism, and a plurality of tappets on said rotary member controlling the escapement of said direction controlling mechanism, and a positive connection between said reciprocating member and wheel whereby said wheel is rotated in one direction when the reciprocating member is advanced, and in the opposite direction when the reciprocating member is returned.

23. In a machine of the character described, a reciprocating member, means for moving the same, and means for disconnecting said reciprocating member from said moving means to permit of manual traverse of said reciprocating member, said moving means while the power is on being controlled by the movement of said reciprocating member whether the latter be moved by said moving means or manually.

24. In a machine of the character described, a reciprocating member, moving means therefor including power operated clutch, and means for disconnecting said reciprocating member from said moving means to permit of manual movement of said reciprocating member, said clutch while the power is on being controlled by the movement of the reciprocating member whether the latter be transversed by said moving means or manually.

25. In a machine of the character described, a reciprocating member, means for moving the same including an escapement ratchet clutch controlling the movement of said reciprocating member, and means for disconnecting said reciprocating member from said moving means to permit of manual traverse of said reciprocating member, said escapement ratchet clutch when the power is on being controlled by the reciprocating member whether the latter be moved by said moving means or manually.

26. In a machine of the character described, a reciprocating member, means for moving the same, means for disconnecting said member from said moving means to permit of manual traverse of said reciprocating member, a rotary tappet wheel controlling said moving means, and a positive connection between said reciprocating member and wheel whereby the latter is rotated when the reciprocating member is traversed by power or manually.

27. In a machine of the character described, a reciprocating member, means for moving the same, means for disconnecting said member from said moving means to permit of manual traverse of said member, a tappet wheel positively connected to said reciprocating member so as to be rotated in one direction when the reciprocating member is advanced and in the opposite direction when the reciprocating member is returned, and a plurality of tappets on said wheel, each tappet being operative when rotated in one direction and inoperative when rotated in the opposite direction.

28. In a machine of the character described, a reciprocating member, a nut carried thereby, a feed screw in threaded engagement with said nut, means for rotating said screw to reciprocate said member, means for disconnecting said feed screw from said moving means, a tappet wheel provided with adjustable tappets controlling said moving means, and a positive connection between said tappet wheel and reciprocating member including a non-longitudinal-movable rotatable shaft having threaded engagement with said nut.

29. In a machine of the character described, a reciprocating member, means for moving the same, means for throwing the power on and off said moving means, controlling means for said moving means, and means for throwing said moving means out of the control of said controlling means when the power is thrown off.

30. In a machine of the character described, a reciprocating member, means for moving the same controlled by the movement of said reciprocating member, means for throwing the power on and off said moving means, and means for throwing said moving means out of the control of said reciprocating member when the power is thrown off.

31. In a machine of the character described, a reciprocating member, means for moving the same, means for throwing the power on and off of said moving means, controlling means for said moving means positively connected to and driven with said reciprocating member, and means for throwing said moving means out of control of said controlling means when the power is thrown off.

32. In a machine of the character described, a reciprocating member, means for moving the same including a power operated clutch controlled by the movement of said reciprocating member, means for throwing the power on and off of said moving means, and means for throwing said clutch out of the control of said reciprocating member when the power is thrown off.

33. In a machine of the character described, a reciprocating member, means for moving the same including a ratchet clutch controlled by the movement of said reciprocating member, means for throwing the power on and off said moving means, and means for throwing said clutch out of the control of said reciprocating member when the power is thrown off.

34. In a machine of the character described, a reciprocating member; means for moving the same including power operated clutches controlling the movement thereof, a ratchet clutch controlling said clutches, and an escapement controlling said ratchet clutch; a tappet wheel controlling said escapement and positively connected to said reciprocating member, means for disconnecting said reciprocating member from said moving means, and means for throwing said escapement out of the control of said tappet wheel when the power is thrown off of said moving means.

35. In a machine of the character described, a reciprocating member, means for moving the same including mechanism provided with an escapement clutch for controlling the direction of movement of said reciprocating member, said moving means also including mechanism provided with an escapement clutch for controlling the speed of travel of said reciprocating member, means for disconnecting said reciprocating member from said moving means, a member movable in opposite directions corresponding to the direction of movement of said reciprocating member, tappets thereon for controlling both of said escapement clutches, and means for throwing said escapement clutches out of the control of said tappets when the power is thrown off.

36. In a machine of the character described, a member adapted to be moved in opposite directions at variable speeds; means for moving said member including a pair of operated clutches for controlling the speed of movement of said member, a pair of power operated clutches for controlling the direction of travel of said member, and an escapement ratchet clutch mechanism for controlling each of said pairs of clutches; means for disconnecting said member from said moving means, a rotatable tappet wheel provided with two sets of adjustable tappets, one set for controlling each of said ratchet clutch mechanisms, means for throwing the power off of said moving means, and means for throwing said escapement ratchet clutch mechanisms out of the control of said tappets when the power is thrown off.

37. In a machine of the character described, a reciprocating member, means for moving the same including power operated clutches controlling the direction of movement of said member, a ratchet clutch controlling said clutches, an automatically operated escapement controlling said ratchet clutch, means for disengaging said ratchet clutch mechanism in a position to throw said power operated clutches into neutral positions at a predetermined point of the cycle of movement of said reciprocating member, and means for preventing manual operation of said disengaging means when the power is off.

38. In a machine of the character described, a reciprocating member, means for moving the same including operated clutches controlling the direction of movement of said member, a ratchet clutch controlling said power operated clutches, an automatically operated escapement controlling said ratchet clutch, means for automatically disengaging said ratchet clutch in a position to throw said power operated clutches into neutral positions at a predetermined point in the cycle of movement of said reciprocating member, means for manually operating said disengaging means, means to release said ratchet clutch, means for throwing the power off of said moving means, and means for preventing actuation of said manually operable means to prevent release of said ratchet clutch when the power is thrown off.

39. In a machine of the character described, a reciprocating member, a pair of power operated clutches controlling the speed of travel of said member, a pair of power operated clutches controlling the direction of movement of said member and driving said reciprocating member through one of the clutches of the first pair, the other clutch of the first pair being effective to move the reciprocating member at a predetermined speed in one direction, an escapement ratchet clutch controlling each pair of power operated clutches, automatically operated means controlling said escapement ratchet clutches, and normally acting means for disengaging the ratchet clutch from said second mentioned pair of power operated clutches for throwing the latter into neutral position at a predetermined point in the cycle of movement of said reciprocating member.

40. In a machine of the character described, a reciprocating member, a pair of power operated clutches controlling the speed of travel of said member, a pair of power operated clutches controlling the direction of movement of said member and driving said reciprocating member through one of the clutches of the first pair, the other clutch of the first pair being effective to move said reciprocating member at a predetermined speed in one direction, an escapement ratchet clutch controlling each pair of said power operated clutches, automatically operated means controlling said escapement ratchet clutches, means for automatically disengaging the ratchet clutch from said second mentioned pair of power operated clutches for throwing the latter into neutral positions at a predetermined point in the cycle of movement of said reciprocating member, and means for preventing manual actuation of said disengaging means when the power is thrown off.

41. In a machine of the character described, a reciprocating member, means for moving the same including a pair of power operated clutches controlling the direction of movement of said member, a ratchet clutch controlling said clutches, an escapement controlling said ratchet clutch, controlling means for said escapement actuated by said reciprocating member, means for automatically disengaging said ratchet clutch in a position to throw both of said power operated clutches into neutral positions at a predetermined point in the cycle of movement of said reciprocating member, means for throwing the power off of said moving means, means for throwing said escapement out of the control of said controlling means when the power is thrown off, and means for preventing manual operation of said disengaging means when the power is thrown off.

42. In a machine of the character described, a work support, means for moving the same to and from its working level and including a clutch adapted for predetermined engagement, power operated means for reciprocating said work support and including a periodically rotatable member, and a device for tripping said clutch and controlled by said rotatable member.

43. In a machine of the character described, a work support, means for moving the same to and from its working level and including a constantly driven gear and a clutch member adapted for periodic engagement therewith, power operated means for reciprocating said work support and including a periodically rotatable member, and a device normally maintaining said clutch member in disengaging position and tripped by said rotatable member to release said clutch member.

44. In a machine of the character described, a work support, means for moving the same to and from its working level and including a constantly driven gear and a clutch member adapted for periodic engagement therewith, said clutch member having a cam surface, means for reciprocating said work support and including a periodically rotatable member and a device having a part adapted to cooperate with the cam surface of said clutch member to retain the latter in disengaging position, said device being tripped by said rotatable member to disengage said part from said cam surface and permit of engagement of said clutch member with said constantly driven gear.

45. In a machine of the character described, an intermittently rotatable shaft, a constantly driven gear loose thereon, a clutch member rotatable with and longitudinally movable of said shaft and adapted for engagement with said gear, said clutch member having a cam surface, a trip lever having a finger normally engaging said cam surface to retain said clutch member in disengaged position, and an intermittently rotatable part for tripping said lever.

46. In a machine of the character described, a frame, a saddle, a support slidable thereon, cooperating teeth between said saddle and frame to raise and lower said saddle and support when the saddle is moved longitudinally, means for longitudinally moving said saddle, means for moving said support on said saddle including a pair of power operated clutches controlling the direction of movement of said support and an automatically operated escapement ratchet clutch mechanism controlling said power operated clutches and said saddle moving means.

47. In a machine of the character described, a frame, a saddle, a work support slidable on said saddle, cooperating teeth between said saddle and frame to cause said saddle to move vertically when the saddle is moved longitudinally, means for reciprocating said work support and including a pair of power operated clutches controlling the direction of movement of said support and an automatically operated escapement ratchet clutch mechanism controlling said power operated clutches and having an intermittently rotatable part, means for moving said work saddle longitudinally and including an intermittently rotatable shaft, a constantly driven gear loose thereon and a clutch member rotatable with and longitudinally movable of said shaft and adapted for periodic engagement with said gear, said clutch member having a cam surface and a trip lever having a finger normally engaging said cam surface and retaining said clutch member in disengaged position, and means on said intermittently rotatable part of said ratchet mechanism for tripping said lever.

48. In a machine of the character described, a work support, means for moving the same to and from its working level and including a clutch adapted for periodic engagement, means for reciprocating said work support including a pair of power operated clutches controlling the direction of movement of said work support, an automatically controlled ratchet clutch mechanism for controlling said power operated clutch and having an intermittently rotatable part, and a tripping device actuated by said rotatable part, and controlling said first mentioned clutch.

49. In a machine of the character described, a reciprocating member, means for moving the same, means for throwing the power on and off of said moving means, controlling means for said moving means positively connected to said reciprocating member, means for disconnecting said reciprocating member from said moving means, and means for throwing said moving means out of the control of said controlling means when the power is thrown off.

50. In a machine of the character described, a reciprocating member, means for moving the same including a power operated clutch controlling the movement of said member, a ratchet clutch controlling said first clutch, an automatically operated escapement controlling said ratchet clutch, means for disengaging said ratchet clutch in a position to throw said first clutch into neutral position at a predetermined point in the cycle of movement of said reciprocating member, and means for preventing manual operation of said disengaging means when the power is off.

BENGT M. W. HANSON.